US010162089B2

(12) United States Patent
Sato et al.

(10) Patent No.: US 10,162,089 B2
(45) Date of Patent: Dec. 25, 2018

(54) LIGHT AMOUNT ADJUSTMENT DEVICE AND OPTICAL DEVICE

(71) Applicant: CANON DENSHI KABUSHIKI KAISHA, Chichibu-shi (JP)

(72) Inventors: Osamu Sato, Hiki-gun (JP); Kyousuke Miyashita, Tokyo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 683 days.

(21) Appl. No.: 14/808,064

(22) Filed: Jul. 24, 2015

(65) Prior Publication Data

US 2015/0331164 A1 Nov. 19, 2015

Related U.S. Application Data

(63) Continuation of application No. PCT/JP2014/000398, filed on Jan. 27, 2014.

(30) Foreign Application Priority Data

Jan. 30, 2013 (JP) ................. 2013-016121

(51) Int. Cl.
G02B 5/22 (2006.01)
G02B 5/20 (2006.01)
G03B 9/02 (2006.01)
G03B 11/00 (2006.01)

(52) U.S. Cl.
CPC ............... *G02B 5/22* (2013.01); *G02B 5/208* (2013.01); *G03B 9/02* (2013.01); *G03B 11/00* (2013.01)

(58) Field of Classification Search
CPC ....... G02B 7/00; G02B 7/006; G02B 27/0081; G02B 26/00; G02B 26/007; G02B 26/008; G02B 26/02; G02B 26/023
USPC ................ 359/885, 887, 888, 889, 890, 892
See application file for complete search history.

(56) References Cited

U.S. PATENT DOCUMENTS 7,163,317 B2 * 1/2007 Warnecke ............... F21S 10/02
  362/281
8,654,429 B2 2/2014 Kato et al.
2002/0044212 A1 4/2002 Hashimoto
2004/0239797 A1 12/2004 Masuda

FOREIGN PATENT DOCUMENTS

JP H11-205639 A 7/1999
JP 2000-162665 A 6/2000
JP 2002-176573 A 6/2002
JP 2002-182263 A 6/2002

(Continued)

OTHER PUBLICATIONS

Aug. 10, 2016 European Search Report in European Patent Appln. No. 14745922.6.

(Continued)

*Primary Examiner* — Robert E Tallman
(74) *Attorney, Agent, or Firm* — Venable LLP

(57) ABSTRACT

A light amount adjustment device of this invention includes a light path forming member including an aperture which forms a light path, a plurality of light amount adjustment members which adjust the amount of light which passes through the aperture, and a plurality of movement units linearly advancing and retracting the light amount adjustment members with respect to the aperture.

15 Claims, 9 Drawing Sheets

(56) References Cited

FOREIGN PATENT DOCUMENTS

| | | |
|---|---|---|
| JP | 2003-114461 A | 4/2003 |
| JP | 2004-126416 A | 4/2004 |
| JP | 2004-246018 A | 9/2004 |
| JP | 2006-307951 A | 11/2006 |
| JP | 2010-049135 A | 3/2010 |
| JP | 2012-003128 A | 1/2012 |
| WO | 2014/119277 A1 | 8/2014 |

OTHER PUBLICATIONS

Feb. 25, 2014 International Search Report in International Patent Appln. No. PCT/JP2014/000398.
May 18, 2017 Chinese Official Action in Chinese Patent Appln. No. 201480006667.0.
May 6, 2016 Japanese Official Action in Japanese Patent Appln. No. 2014-559563.

* cited by examiner

LIGHT AMOUNT ADJUSTMENT DEVICE AND OPTICAL DEVICE

This application is a continuation of International Patent Application No. PCT/JP2014/000398 filed on Jan. 27, 2014, and claims priority to Japanese Patent Application No. 2013-016121, filed Jan. 30, 2013, the entire content of both of which are incorporated herein by reference.

BACKGROUND OF THE INVENTION

Field of the Invention

The present invention relates to a light amount adjustment technique.

Description of the Related Art

An optical device such as a camera or interchangeable lens sometimes includes a light amount adjustment member such as an ND filter, IR cut filter, or deflection filter in order to adjust the light amount. Japanese Patent Laid-Open No. 2002-176573 has disclosed a device capable of switching filters to be used to adjust the light amount by linearly moving a filter holder integrally holding a plurality of filters.

The device disclosed in Japanese Patent Laid-Open No. 2002-176573 has an arrangement in which the plurality of filters are mounted as they are arranged in one direction in the filter holder, and all the filters are moved at once by a single moving mechanism. When the number of filters is increased, therefore, the length of the filter holder increases in proportional to the number of filters, and this makes miniaturization of the device difficult.

SUMMARY OF THE INVENTION

The present invention provides a technique capable of miniaturizing a light amount adjustment device and optical device.

According to an aspect of the present invention, there is provided a light amount adjustment device comprising a light path forming member including an aperture for forming a light path, a plurality of light amount adjustment members configured to adjust an amount of light passing through the aperture, and a plurality of movement units configured to linearly advance and retract the light amount adjustment members with respect to the aperture.

According to another aspect of the present invention, there is provided an optical device comprising the light amount adjustment device.

Further features of the present invention will become apparent from the following description of exemplary embodiments (with reference to the attached drawings).

DESCRIPTION OF THE EMBODIMENTS

First Embodiment

Figure 1:
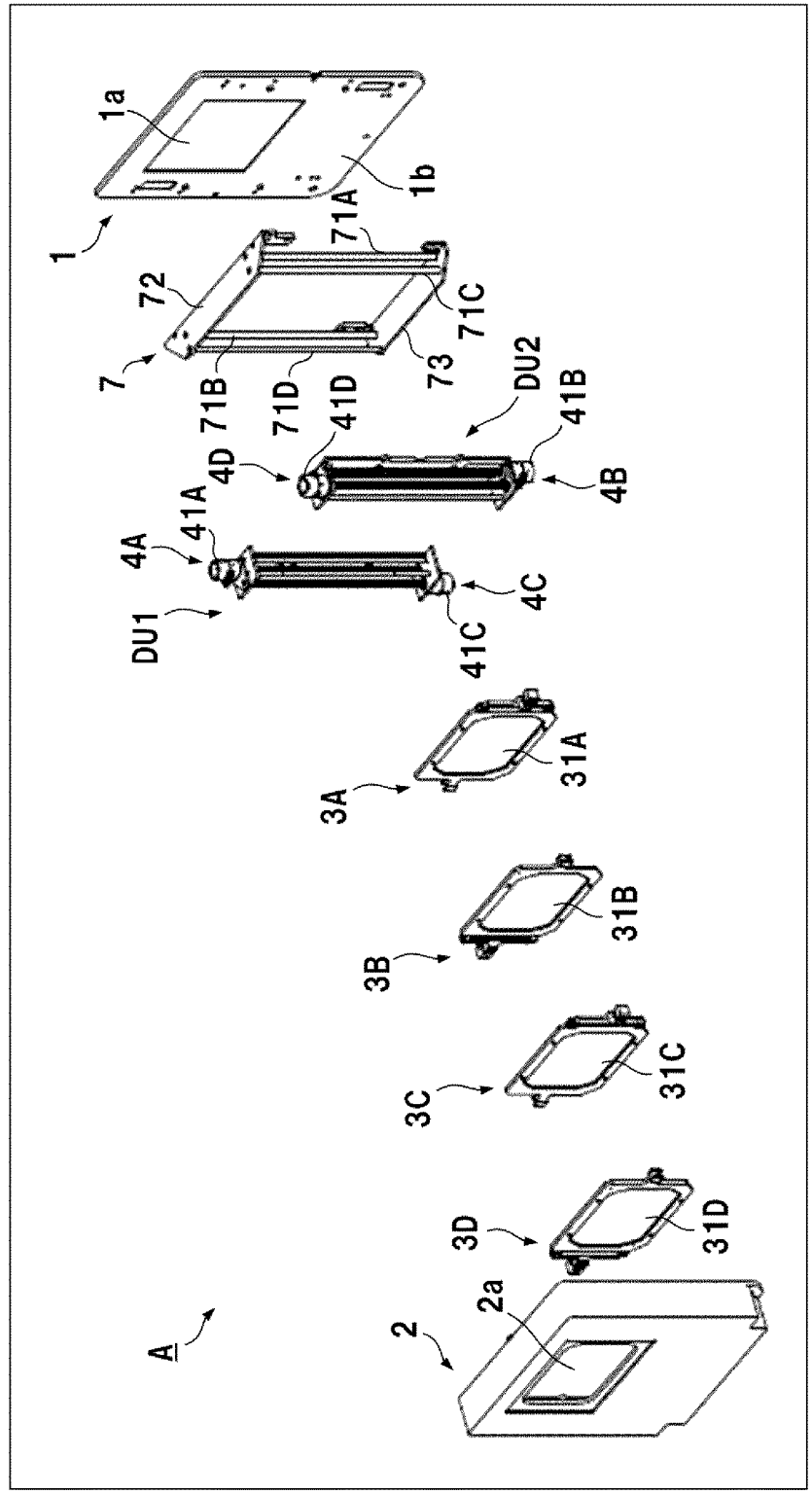
FIG. 1 is an exploded perspective view of a light amount adjustment device according to an embodiment of the present invention.
Figure 2:
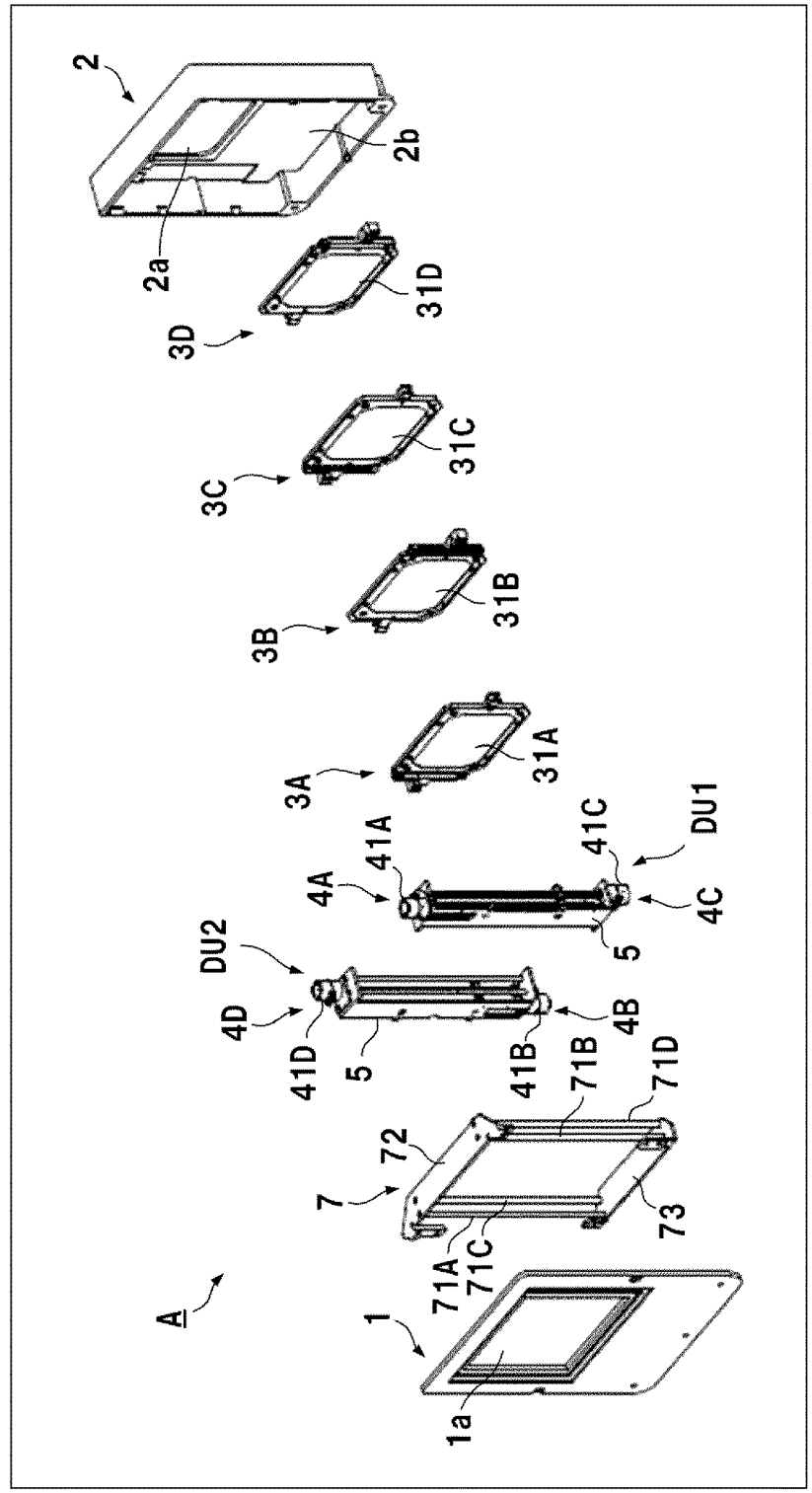
FIG. 2 is an exploded perspective view in which the light amount adjustment device shown in FIG. 1 is viewed in the opposite direction.
Figure 3A:
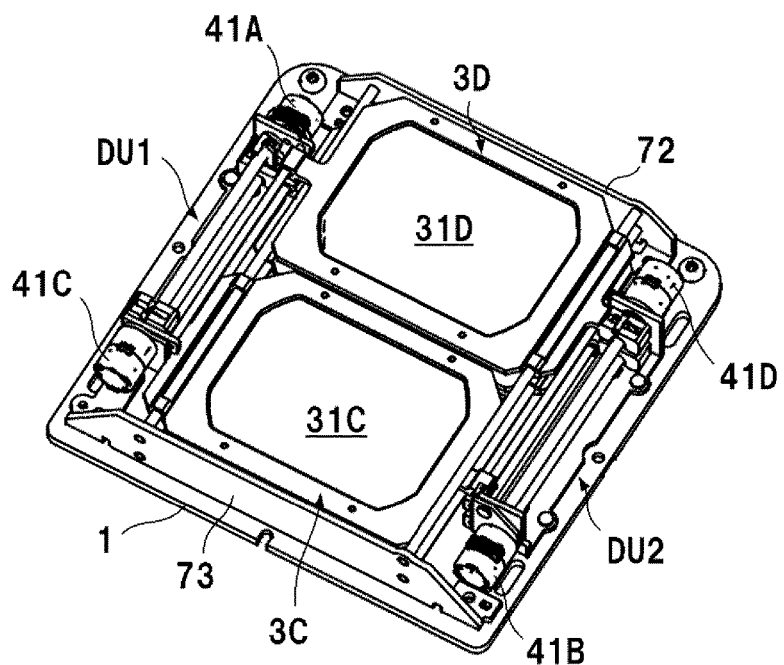
FIG. 3A is an assembly view of the light amount adjustment device shown in FIG. 1 with some parts being removed.
Figure 3B:
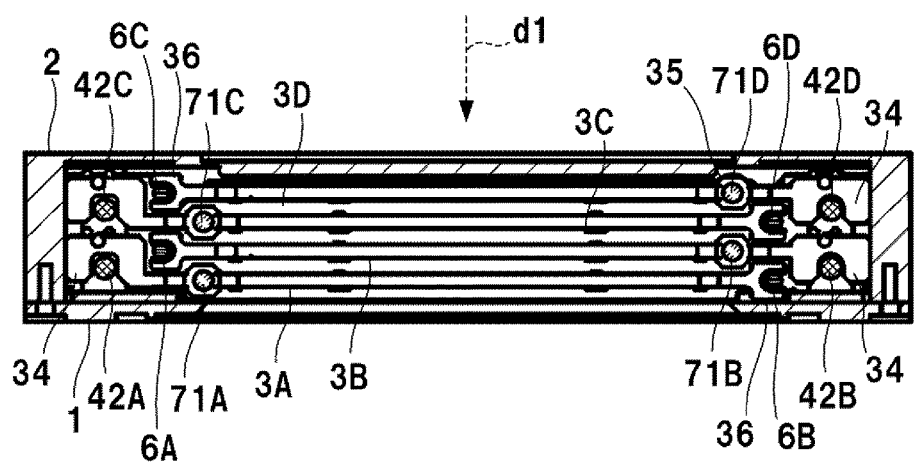
FIG. 3B is a sectional view of the light amount adjustment device shown in FIG. 1.

The arrangement of a light amount adjustment device A according to an embodiment of the present invention will be explained below with reference to FIGS. 1 to 3B. FIGS. 1 and 2 are exploded perspective views of the light amount adjustment device A when it is viewed in opposite directions. The light amount adjustment device A includes a base plate 1, a cover 2, a plurality of filter units 3A to 3D (to be also referred to as filter units 3 when collectively called), driving units DU1 and DU2, and a guide unit 7. FIG. 3A is an assembly view of the light amount adjustment device A with the cover 2 being removed. FIG. 3B is a sectional view of the light amount adjustment device A.

The base plate 1 is a flat plate, and has an aperture 1a which forms a light path. A retraction space forming portion 1b for forming a retraction space which allows the filter units 3A to 3D to retract outside the aperture 1a is formed below it. The central-line direction (an arrow d1 in FIG. 3B) of the aperture 1a will sometimes be called an optical-axis direction hereinafter. The driving units DU1 and DU2 and guide unit 7 are fixed to the base plate 1.

The cover 2 has a boxy shape having an open rear portion, and has an aperture 2a for forming a light path in the front surface. The aperture 2a is formed in a position overlapping the aperture 1a in the optical-axis direction. A retraction space forming portion 2b for forming a retraction space which allows the filter units 3A to 3D to retract outside the aperture 2a is formed below it.

The base plate 1 is attached to the rear surface of the cover 2, thereby forming a boxy hollow member as a whole. The aperture 2a is set to be smaller than the aperture 1a. In this embodiment, it is assumed that incident light passes in the order of aperture 2a→aperture 1a. Thus, the base plate 1 and cover 2 form light path forming members. Also, the space between the retraction space forming portions 1b and 2b functions as the retraction space for the filter units 3A to 3D.

The filter units 3A to 3D respectively include plate-like light amount adjustment members 31A to 31D (to be also referred to as light amount adjustment members 31 when collectively called). Each of the light amount adjustment members 31A to 31D is an optical member such as an ND filter, IR cut filter, or deflection filter. The light amount adjustment members 31A to 31D can be different kinds of optical members or the same kind of optical members. It is also possible to use both the same kind of optical members and different kinds of optical members. When using the same kind of optical members, for example, light reduction filters, the light reduction amount can be changed by the number of filter units 3 to be advanced on the apertures 1*a* and 2*a*.

The filter units 3A to 3D are arranged in the optical-axis direction. More specifically, the light amount adjustment members 31A to 31D are arranged such that the normal direction is parallel to the optical-axis direction, thereby forming a four-layered structure.

The pair of driving units DU1 and DU2 (to be also referred to as driving units DU when collectively called) moves the filter units 3A to 3D. In this embodiment, the driving units DU1 and DU2 oppose each other with the apertures 1*a* and 2*a* being sandwiched between them. Although the number of driving units DU is two in this embodiment, it may also be one or three or more and is properly selected in accordance with the number of filter units 3.

The driving unit DU linearly moves the filter unit 3 in a direction perpendicular to the optical-axis direction, between a position on the apertures 1*a* and 2*a* and a position in the retraction space. When the filter unit 3 is moved to the position on the apertures 1*a* and 2*a*, incident light passes through the light amount adjustment member 31 of the filter unit 3, so the light amount can be adjusted. The guide unit 7 guides the movement of the filter unit 3.

In this embodiment, the filter units 3A to 3D can individually be moved independently of each other as will be described below. Consequently, it is possible to individually linearly advance and retract the light amount adjustment members 31A to 31D with respect to the apertures 1*a* and 2*a*. The driving units DU1 and DU2 and guide unit 7 will be explained with reference to FIGS. 4A, 4B, and 5.

Figure 4A:
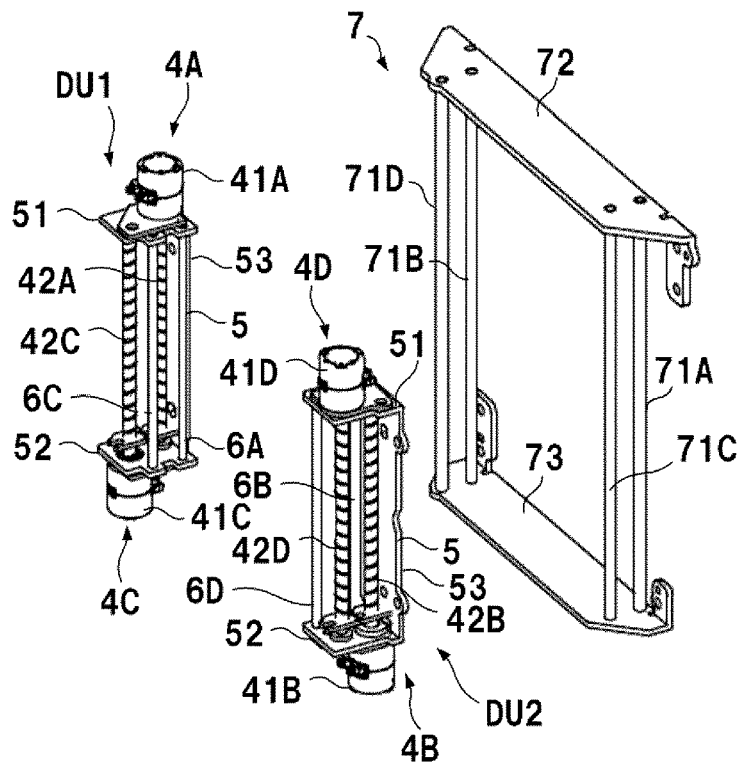
FIG. 4A is a perspective view of some parts of the light amount adjustment device shown in FIG. 1.
Figure 4B:
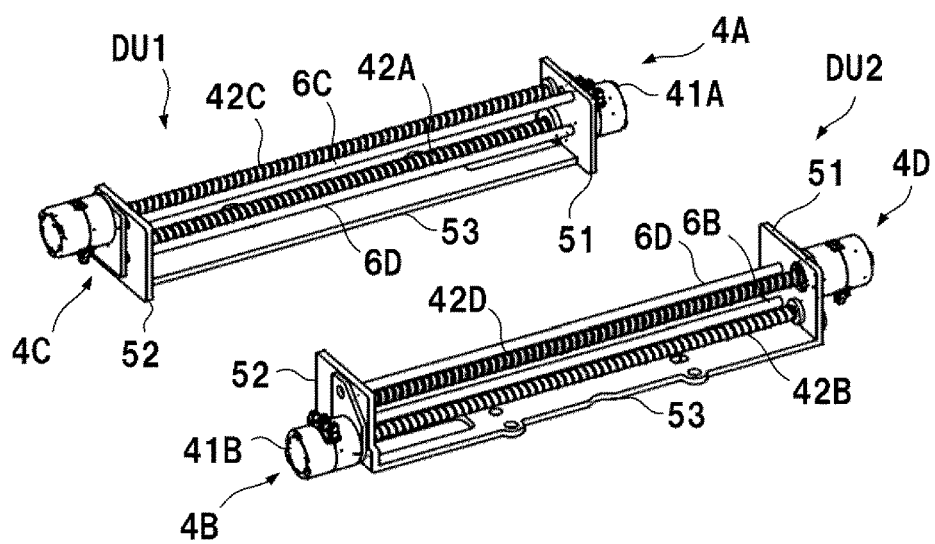
FIG. 4B is a perspective view of some parts of the light amount adjustment device shown in FIG. 1.
Figure 5:
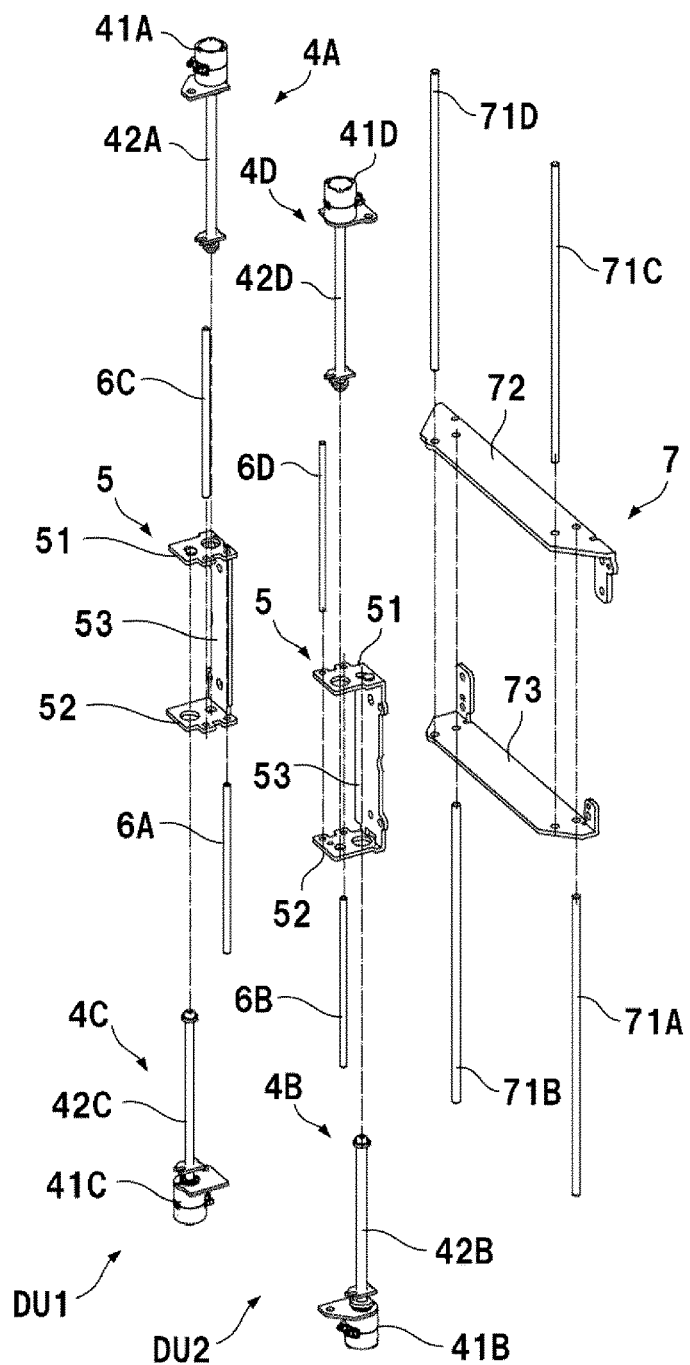
FIG. 5 is an exploded perspective view of some parts of the light amount adjustment device shown in FIG. 1.

FIG. 4A is a perspective view of the driving units DU1 and DU2 and guide unit 7. FIG. 4B is a perspective view of the driving units DU1 and DU2 when they are viewed in a direction different from that of FIG. 4A. FIG. 5 is an exploded perspective view of the driving units DU1 and DU2 and guide unit 7.

The driving unit DU1 includes movement mechanisms 4A and 4C as portions of movement units, a support member 5, and guide shafts 6A and 6C as guide members. The driving unit DU2 includes movement mechanisms 4B and 4D, a support member 5, and guide shafts 6B and 6D. The movement mechanisms 4A to 4D (to be also referred to as movement mechanisms 4 when collectively called) are mechanisms for moving the filter units 3A to 3D, respectively. The guide shafts 6A to 6D (to be also referred to as guide shafts 6 when collectively called) are formed as rotation stoppers for the filter units 3A to 3D, and also have a function of guiding the movement of the filter units 3A to 3D.

The movement mechanism 4A includes a motor 41A and converter 42A. Although the motor 41A is a stepping motor in this embodiment, it may also be another kind of motor. The converter 42A is a mechanism which converts the output from the motor 41A into a linear motion and linearly moves the filter unit 3A along a direction in which the driving shaft of the converter 42A extends, and is a lead screw in this embodiment. When the guide shaft 6A extends over at least a range from one end to the other end of the aperture along the edges of the apertures 1*a* and 2*a*, the driving shaft of the converter 42A need only have a length covering the range from one end to the other end of the aperture. In this case, the filter unit 3A can stably be moved even if the driving shaft of the converter 42A does not extend over the apertures 1*a* and 2*a*.

The movement mechanisms 4B to 4D have the same arrangement as that of the movement mechanism 4A. That is, the movement mechanism 4B includes a motor 41B and converter 42B, the movement mechanism 4C includes a motor 41C and converter 42C, and the movement mechanism 4D includes a motor 41D and converter 42D. The motors 41A to 41D will be referred to as motors 41 when collectively called, and the converters 42A to 42D will be referred to as converters 42 when collectively called.

Note that the movement mechanism 4 includes the motor 41 and converter 42 in this embodiment, but it is, of course, also possible to adopt another arrangement. For example, the movement mechanism 4 can also include a piezoelectric element, and a driving rod connected to the piezoelectric element.

The support member 5 is common to a plurality of movement mechanisms 4. In this embodiment, the support member 5 supports two movement mechanisms 4. It is, of course, also possible to adopt an arrangement in which the support member 5 supports three or more movement mechanisms.

The support member 5 includes a pair of motor support portions 51 and 52 spaced apart from and opposing each other, and an attaching portion 53 connecting the motor support portions 51 and 52 and fixed to the base plate 1. The support member 5 may also be integrated with the base plate 1.

The motor 41 is fixed to the motor support portions 51 and 52. The converter 42 is disposed between the motor support portions 51 and 52 such that one end is connected to the motor 41, and the other end is rotatably axially supported by the motor support portion 51 or 52. The guide shaft 6 is extended parallel to the converter 42 between the motor support portions 51 and 52.

In the driving unit DU1 of this embodiment, the movement mechanisms 4A and 4C are supported by the support member 5, the motor 41A is supported by the motor support portion 51, and the motor 41C is supported by the motor support portion 52. That is, the movement mechanisms 4A and 4C are attached parallel to each other as they are vertically inverted. Likewise, in the driving unit DU2, the movement mechanisms 4B and 4D are supported by the support member 5, the motor 41B is supported by the motor support portion 52, and the motor 41D is supported by the motor support portion 51. That is, the movement mechanisms 4B and 4D are attached parallel to each other as they are vertically inverted.

By thus supporting the two pairs of movement mechanisms 4 parallel to each other by the common support member 5, it is readily possible to accurately position the converters 42 and guide shafts 6. Also, the motors 41 are arranged such that they are vertically inverted. When compared to a case in which the motors 41 are juxtaposed adjacent to each other, therefore, the device can be miniaturized by effectively using the dead space. It is also possible to move the filter units 3 in a narrow space in the optical-axis direction without any interference between them.

Furthermore, in this embodiment, portions (the converters 42) of the movement mechanisms 4A and 4C are so arranged as to overlap each other in the optical-axis direction, so the driving units DU1 and DU2 can be miniaturized. Note that this similarly applies to the movement mechanisms 4B and 4D. In addition, the miniaturization of the driving units DU1 and DU2 largely contributes to the miniaturization of the light amount adjustment device A.

Note that this embodiment has exemplified the structure in which the two converters 42 are arranged to overlap each other in the optical-axis direction in the driving units DU1 and DU2, but the two converters 42 may also be arranged so as not to overlap each other in the optical-axis direction. This is so because, as will be described in detail later, it is possible to sufficiently miniaturize the light amount adjustment device A by arranging at least portions of the driving units DU1 and DU2 such that these portions overlap each other.

The guide unit 7 includes a pair of support portions 72 and 73, and guide members 71A to 71D (to be also referred to as guide members 71 when collectively called) extended between them. The support portions 72 and 73 are fixed to the base plate 1. The support portions 72 and 73 may also be integrated with the base plate 1. In this embodiment, the guide member 71 is a columnar shaft and has a diameter larger than that of the guide shaft 6.

The guide member 71A guides the movement of the filter unit 3A, that is, the movement of the light amount adjustment member 3A, and the guide member 71B guides the movement of the filter unit 3B. Similarly, the guide member 71C guides the movement of the filter unit 3C, and the guide member 71D guides the movement of the filter unit 3D.

In an assembled state as shown in FIG. 3B, the guide shaft 6B and guide member 71A are positioned parallel to each other on the same plane perpendicular to the optical-axis direction (d1). The converter 42A is positioned to be slightly shifted from this plane in the optical-axis direction. This applies to the relationships between the movement mechanisms 4B to 4D and guide members 71B to 71D. Note that it is also possible to adopt an arrangement in which the guide members 71 are formed in the driving units DU1 and DU2. In this case, the guide member 71 is extended between the motor supports portions 51 and 52.

Figure 6:
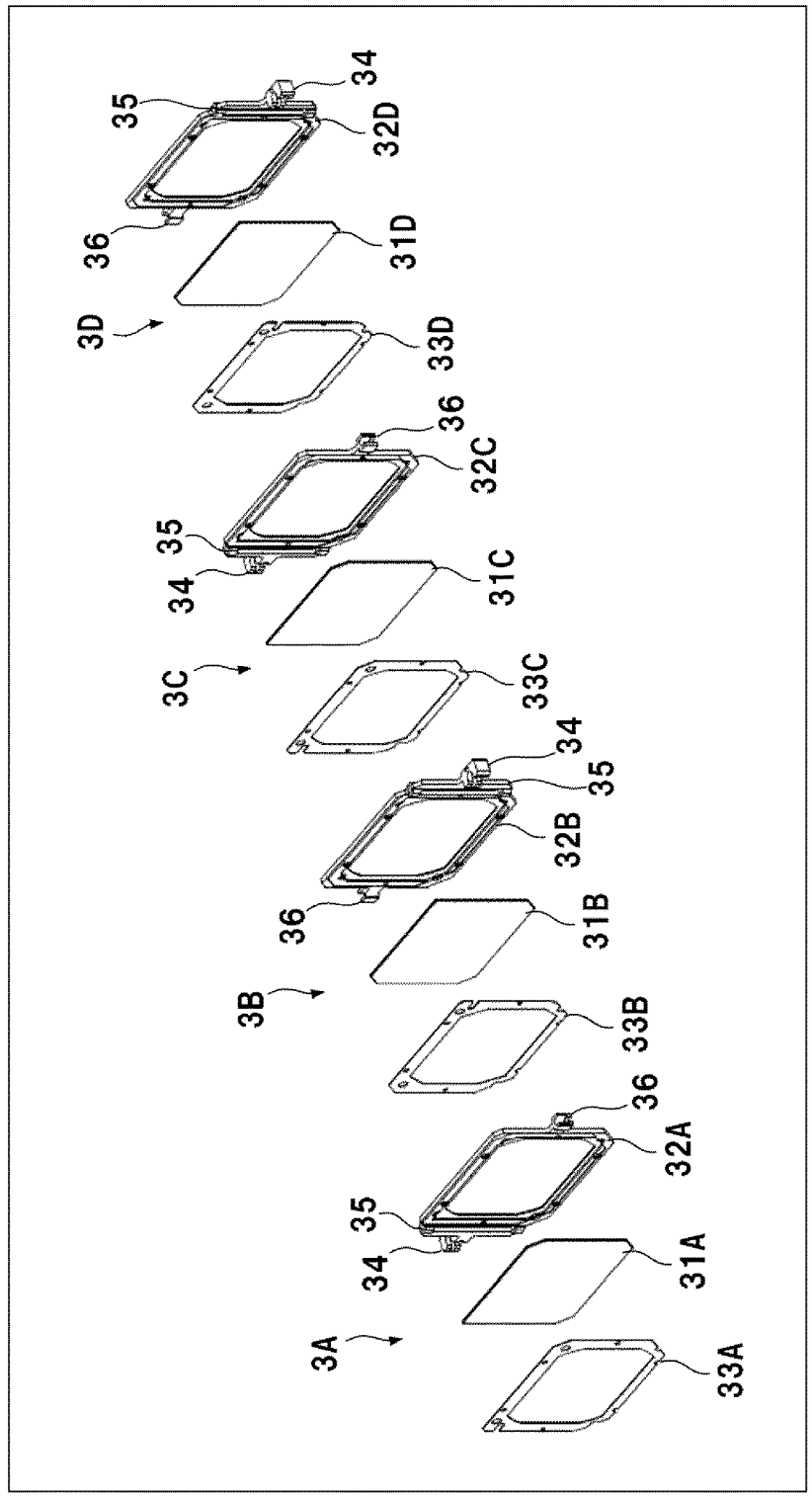
FIG. 6 is an exploded perspective view of some parts of the light amount adjustment device shown in FIG. 1.
Figure 7:
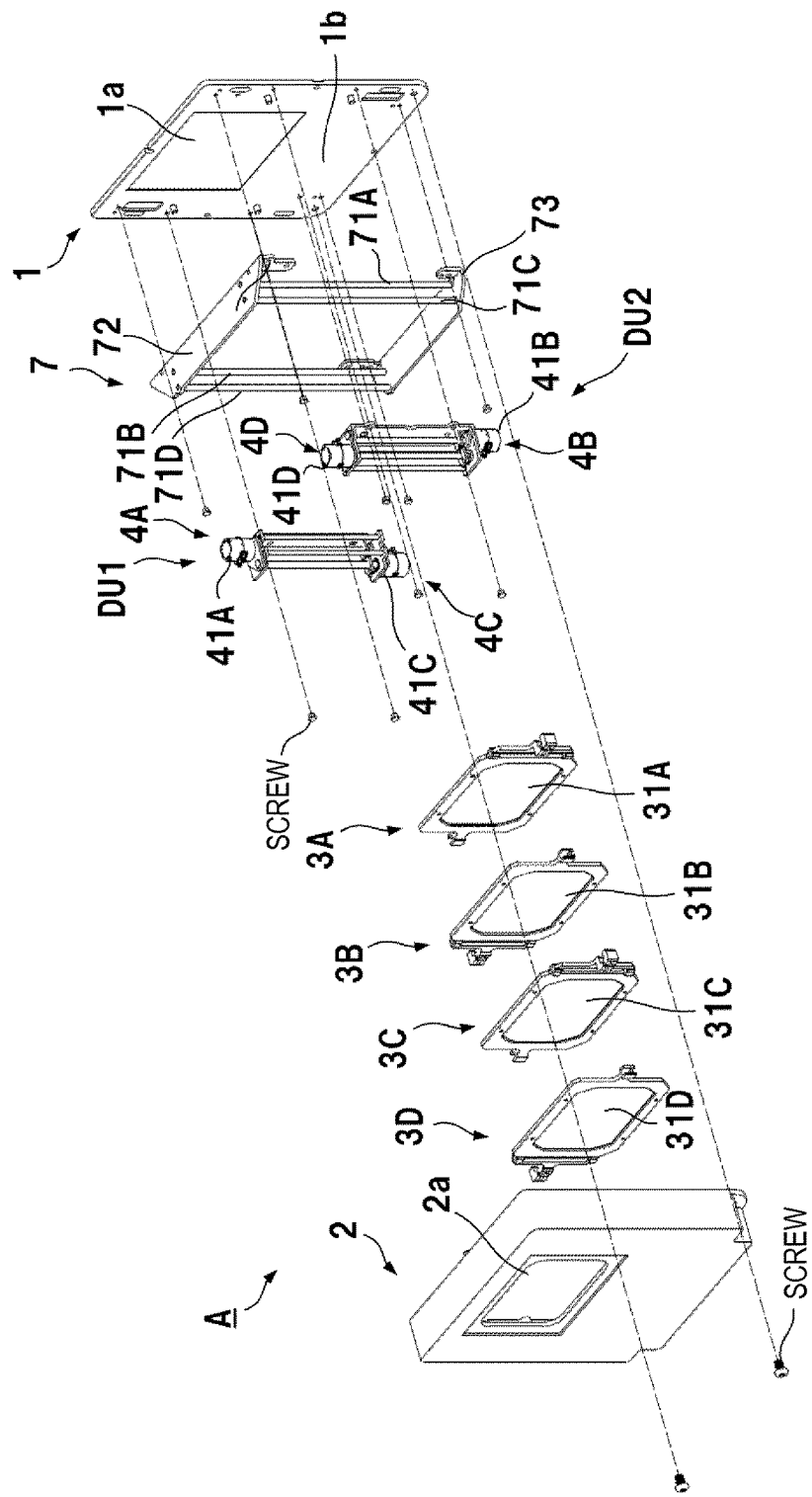
FIG. 7 is an exploded perspective view of the light amount adjustment device shown in FIG. 1.

Next, the arrangement of the filter unit 3 related to the movement by the movement mechanism 4 will be explained with reference to FIG. 6. FIG. 6 is an exploded perspective view of the filter units 3A to 3D. FIG. 7 is an exploded perspective view of the light amount adjustment device A, which shows the way the individual components are screwed.

In this embodiment as shown in FIG. 7, the cover 2, the plurality of filter units 3A to 3D, the driving units DU1 and DU2, and the guide unit 7 are screwed to the base plate 1. The filter unit 3 includes the three members, but the number of constituent members is not limited. The filter units 3A to 3D have arrangements in which the light amount adjustment members 31A to 31D as a plurality of optical filter elements having different light transmittances are clamped and held by holding members 32A to 32D and press plates 33A to 33D.

The light amount adjustment device A includes the plurality of optical filter elements having different light transmittances. The amount of light entering an image sensor can be adjusted by switching the optical filter elements to be inserted into the light path.

The optical filter element is a member which adjusts the transmission of light. The plurality of optical filter elements may also be held on a single substrate, and form regions having different densities as one optical filter. In this embodiment, the light amount adjustment device A includes a plurality of optical filters. The plurality of optical filter elements may also be arranged in different optical filters. The light amount adjustment device may also include one optical filter, and a plurality of optical filter elements may also be arranged in the optical filter. In this embodiment, the light amount adjustment members 31A to 31D as a plurality of optical filter elements are held by the different holding members 32A to 32D.

In this embodiment, the light amount adjustment device A includes the four light amount adjustment members 31A to 31D. However, the number of optical filter elements of the light amount adjustment device A is not limited to this, and the light amount adjustment device A need only include two or more optical filter elements. The light amount adjustment members 31A to 31D have different optical densities. That is, the light amount adjustment members 31A to 31D have different light transmittances. This optical filter element can be a light reduction filter such as an ND filter. For example, the light amount adjustment device A may include three or more ND filter elements having different light transmittances, and includes three ND filters and one AR filter as a plurality of optical filter elements.

More specifically, the light amount adjustment device A includes an AR filter (called ND_00) having an almost zero optical density, and ND filters (called ND_05, ND_10, and ND_15) having optical densities of 0.5, 1.0, and 1.5. ND_00, ND_05, ND_10, and ND_15 were formed by stacking a plurality of thin inorganic films having different refractive indices on a transparent substrate so that the reflected light color is green for different manufacturing batches, in order to make changes in ghost inconspicuous from the image sensing results when switching optical filters. The optical density (OD) is represented by OD=Log(1/T) when the transmittance of the filter is T, and decreases as the transmittance increases. The light amount adjustment members 31A to 31D are arranged in ascending order of optical density toward an object along a direction parallel to the optical-axis direction, linearly move in a direction perpendicular to the optical axis, and advance and retract upon the optical axis. On the optical axis, a space which the optical filters enter and leave and a lens for forming an image of incident light from an object on an imaging element for imaging the incident light are arranged in order toward the object from the imaging element. At the time of imaging, the light amount adjustment members 31A to 31D enter and leave, along the driving shaft, the space which the optical filters enter and leave one by one in descending or ascending order of transmittance, so the light amount entering the imaging element can stably be switched by using a simple arrangement. Since the optical filters are advanced and retracted with stable postures along the driving shafts of the converters 42A to 42D, it is possible to accurately align the directions of the reflection surfaces of the plurality of optical filters. In addition, the reflected light colors on those surfaces of the light amount adjustment members 31A to 31D, which face the imaging element, are practically equal. That is, since the reflected light colors of those surfaces of all the optical filters, which face the imaging element, are practically equal, the color of a ghost remains unchanged even when the optical filters are switched. Accordingly, good imaging results can be obtained without giving the user a sense of incongruity.

"The reflected light colors are practically equal" means the following. For example, the reflected light colors of the plurality of optical filters are preferably equal within the range of a color difference of a marking pen (to be described later), preferably equal within the range of a region where the colors are identified as a color of the same kind under various identification conditions and regarded as uniform, and within the range of a color difference of a marking pen, more preferably equal within the range in which the colors are regarded as almost identical after comparison with time, more preferably equal within the range identified as an allowable error range when various error elements are taken into consideration, and more preferably equal within an unidentifiable range within which no color difference can be identified by measurement.

The amount of light to the imaging element is preferably controlled by switching one of the light amount adjustment members 31A to 31D, in order to prevent reflection between the plurality of light amount adjustment members. Of the plurality of optical filter elements, the reflected light colors of two optical filter elements having close transmittances are preferably practically equal. "Optical filter elements having close transmittances" indicate two (a pair of) adjacent optical filter elements when the plurality of optical filter elements are arranged in the order of transmittance. In this embodiment, the transmittances of the light amount adjustment members 31A to 31D as optical filter elements have a relationship of light amount adjustment member 31A (ND_00)>light amount adjustment member 31B (ND_05) >light amount adjustment member 31C (ND_10)>light amount adjustment member 31D (ND_15). In this case, "two optical filter elements having close transmittances" indicate a pair of the light amount adjustment members 31A and 31B, a pair of the light amount adjustment members 31B and 31C, and a pair of the light amount adjustment members 31C and 31D. In each pair of the optical filter elements, the reflected light colors are preferably practically equal. In this case, when switching two optical filter elements having close transmittances, a sense of incongruity given to the user can be reduced. When the reflected light colors of two (a pair of) adjacent optical filter elements are equal within the range in which the colors are regarded as almost identical within the range of a color difference of a marking pen, the light amount adjustment members 31A and 31D need only be equal within the range of management of a color on a color name level of a chromatic color. That is, the reflected light colors of the light amount adjustment members 31A, 31B, 31C, and 31D may be blue-green, green with a blue tint, green with a yellow tint, and green, respectively. In this case, for all the pairs of the optical filter elements described above, the reflected light colors of the optical filter elements are more preferably equal within the range in which the colors are regarded as almost identical after comparison with time.

The transmittance of an ND filter is controlled by using an unsaturated product ($Ti_xO_y$) of a thin inorganic film. Therefore, the light amount adjustment member 31A having a small transmittance change is first assembled into the light amount adjustment device A, and then the light amount adjustment members 31B, 31C, and 31D are assembled in this order, that is, the light amount adjustment member 31D which readily changes the density due to an environmental change is assembled last. This can improve the maintenability.

The holding members 32A to 32D include engaging portions 34 to 36. The engaging portions 34 and 35 are positioned on one side portion of each of the holding members 32A to 32D, and the engaging portion 36 is positioned on the other side portion of each of the holding members 32A to 32D.

The engaging portion 34 engages with the converter 42. In this embodiment as described earlier, the converter 42 is a lead screw, and the engaging portion 34 forms a nut which threadably engages with the lead screw and moves in the axial direction by rotation. The engaging portion 35 is a trench into which the guide shaft 6 is inserted. The engaging portion 36 is a trench into which the guide member 71 is inserted.

In the light amount adjustment device A having the arrangement described above, when the converter 42 is rotated by driving the motor 41 of the movement mechanism 4, a movement force is biased to the corresponding filter unit 3 via the engaging portion 34. That is, rotation of the filter unit 3 is stopped by the engagement between the engaging portion 36 and guide shaft 6. When the converter 42 is rotated, therefore, a force of moving the engaging portion 34 in the axial direction of the converter 42 acts, so the filter unit 3 can linearly be moved. In this case, the filter unit 3 smoothly moves because the engaging portion 35 is guided by the guide member 71.

The moving directions of the filter unit 3 can be switched by the rotating direction of the motor 41. A sensor for sensing the position of the filter unit 3 may also be installed in order to more accurately control the position. This sensor can be installed so as to sense movement to the movement end of the engaging portion 34 on the converter 42. When using a stepping motor as the motor 41 as in this embodiment, the motor 41 is driven until step out when the engaging portion 34 moves to the movement end. This makes it possible to confirm the movement to the movement end without any sensor.

Since the movement mechanisms 4A to 4D are respectively allocated to the filter units 3A to 3D, the filter units 3A to 3D can individually be moved independently of each other. The filter units 3 are linearly moved between the position on the apertures 1a and 2a and the retraction space between the retraction space forming portions 1b and 2b, so it is possible to selectively switch the light amount adjustment members 31 to be positioned on the apertures 1a and 2a. A plurality of light amount adjustment members 31 may also be positioned on the apertures 1a and 2a.

In this embodiment, the light amount adjustment members 31 are individually moved independently of each other by using the plurality of movement mechanisms 4, so the retraction space need only be almost the same space as the apertures 1a and 2a. That is, the retraction space need only allow one filter unit 3 to retract on a plane perpendicular to the optical-axis direction, and hence can be minimized. The device can be miniaturized by thus using the plurality of movement mechanisms 4.

In this embodiment, one movement mechanism 4 moves one filter unit 3 (that is, one light amount adjustment member 31). However, one movement mechanism 4 may also move a plurality of light amount adjustment members 313. It is also possible to install two movement mechanisms 4 each of which moves a plurality of light amount adjustment members 313, and install two light amount adjustment members 31 in one filter unit 3, so that the number of filter units 3 is two. In either case, the two light amount adjustment members 31 simultaneously move when one filter unit 3 is moved, and this makes efficient light amount adjustment feasible.

In this case, the retraction space must be enlarged in proportion to the number of light amount adjustment members 31 to be moved by one movement mechanism 4. However, the retraction space is still half that when moving all of the (four) light amount adjustment members 31 at the same time, so the device can be miniaturized as well.

In this embodiment, at least portions of the driving units DU1 and DU2 are arranged to oppose each other with the filter units 3A, 3B, 3C, and 3D being sandwiched between them. Consequently, the thickness of the device in the optical-axis direction can further be decreased. More specifically, as shown in FIG. 4, the converters 42A and 42B between the driving units DU1 and DU2 are arranged to overlap each other in the direction perpendicular to the optical-axis direction. Also, the converters 42C and 42D between the driving units DU1 and DU2 are arranged to overlap each other in the direction perpendicular to the optical-axis direction. Accordingly, the intervals between the filter units 3A to 3D in the optical-axis direction can be decreased, so the light amount adjustment device A can further miniaturized in the optical-axis direction.

The filter units 3A to 3D include the engaging portions 34 as connecting portions to be connected to the converters 42A to 42D. To prevent interference between the filter units 3A to 3D adjacent to each other, the engaging portions 34 are connected to the converters 42A to 42D in the optical-axis direction by detouring around the unit end portions. This makes it possible to densely arrange the intervals between the plurality of filter units 3A to 3D, and miniaturize the light amount adjustment device A.

In addition, in this embodiment, the filter units 3A to 3D are guided by the guide shafts 6A to 6D formed in the driving units DU1 and DU2. This achieves stable unit movement. Note that the guide shafts 6A to 6D are arranged between the converters 42A and 42C on one side and the converters 42B and 42D on the other side. This achieves stable unit movement while maintaining the miniaturization of the light amount adjustment device A.

Also, in this embodiment, the guide members 71A to 71D formed in the guide unit 7 are arranged inside the above-described guide shafts 6A to 6D, thereby achieving stable movement of the filter units 3A to 3D. Note that it is also possible to simplify the arrangement by omitting the guide members 71A to 71D.

Furthermore, the driving units DU for moving the filter units 3 are allocated to every other filter unit 3 in the array order in the optical-axis direction. More specifically, the filter units 3A and 3C are moved by forming the movement mechanisms 4A and 4C in the driving unit DU1, and the filter units 3B and 3D are moved by forming the movement mechanisms 4B and 4D in the driving unit DU2. Accordingly, even when the four layers of the filter units 3 are densely arranged in the optical-axis direction, the space between the filter units 3 can easily be secured for each driving unit DU. This makes it possible to secure the assembling space of the movement mechanisms 4 and the like by avoiding interference between the filter units 3 while further decreasing the thickness of the device in the optical-axis direction.

Second Embodiment

Figure 8:
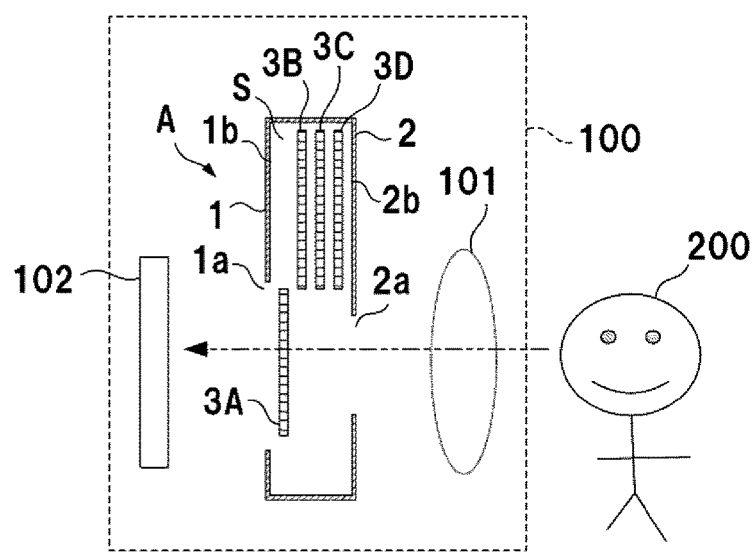
FIG. 8 is a schematic view of an optical device including the light amount adjustment device shown in FIG. 1.

A light amount adjustment device of the present invention is applicable to various optical devices, for example, an imaging device such as a camera or an interchangeable lens. FIG. 8 is a schematic view showing an optical device 100 including the light amount adjustment device A.

The optical device 100 shown in FIG. 8 is an imaging device, and includes an image sensor 102 for imaging incident light from an object 200, a lens 101 for forming an image of incident light 6 on the image sensor 102, and the light amount adjustment device A. The light amount adjustment device A is arranged between the image sensor 102 and lens 101, and can be operated to pass light having a specific wavelength from the incident light.

In this example shown in FIG. 8, the filter unit 3A is positioned on the apertures 1a and 2a, and the other filter units 3B to 3D are positioned in a retraction space S.

Note that as shown in FIG. 8, the light amount adjustment device A is arranged between the lens 101 and image sensor 102 and hence unaffected by the lens performance when compared to a case in which the light amount adjustment device A is installed between lenses. This also facilitates miniaturization more than when the light amount adjustment device is installed between a lens and object.

Third Embodiment

Figure 9A:
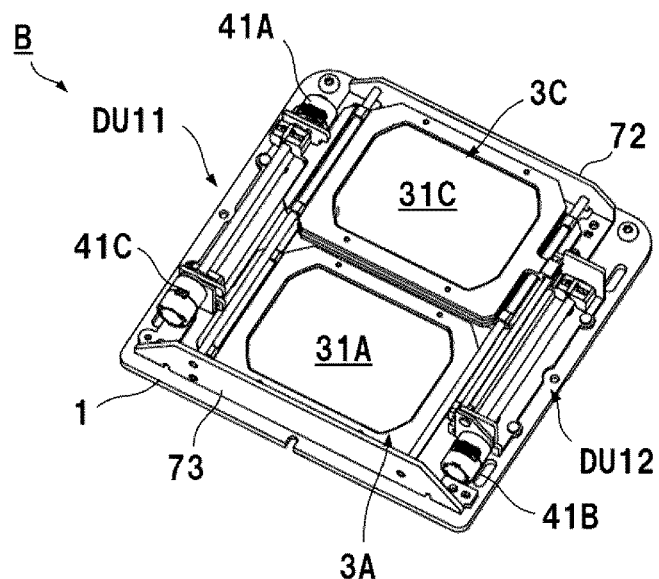
FIG. 9A is a perspective view of a light amount adjustment device according to the third embodiment.

In the above-mentioned first embodiment, the number of light amount adjustment members 31 is four. However, the number of light amount adjustment members 31 may also be two, three, or five or more. FIG. 9A shows a light amount adjustment device B according to an example. The same reference numerals as in the light amount adjustment device A denote the same components in the light amount adjustment device B, and a repetitive explanation thereof will be omitted. FIG. 9A is a perspective view of the light amount adjustment device B with a cover 2 being removed.

In this example shown in FIG. 9A, the device includes three filter units 3A to 3C (the filter unit 3B is not shown) as filter units 3. The device also includes driving units DU11 and DU12 as driving units DU. The driving unit DU11 includes movement mechanisms 41A and 41C and drives the filter units 3A and 3C. The driving unit DU12 includes a movement mechanism 41B and drives the filter unit 3B.

Fourth Embodiment

Figure 9B:
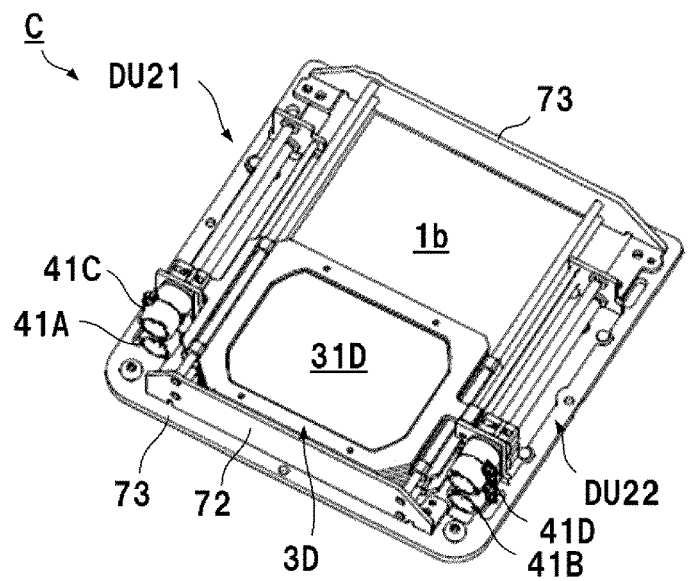
FIG. 9B is a perspective view of a light amount adjustment device according to the fourth embodiment.

In the above-mentioned first embodiment, portions (the converters 42) of the movement mechanisms 4A and 4C are so arranged as to overlap each other in the direction parallel to the optical-axis direction, and this applies to the movement mechanisms 4B and 4D. However, the movement mechanisms 4A and 4C may also entirely overlap each other in the direction parallel to the optical-axis direction, and the movement mechanisms 4B and 4D may also entirely overlap each other in the direction parallel to the optical-axis direction. FIG. 9B shows a light amount adjustment device C as an example. The same reference numerals as in the light amount adjustment device A denote the same components in the light amount adjustment device C, and a repetitive explanation thereof will be omitted. FIG. 9B is a perspective view of the light amount adjustment device C with a cover 2 being removed.

In this example shown in FIG. 9B, the device includes driving units DU21 and DU22 as driving units DU. The driving unit DU21 includes movement mechanisms 41A and 41C. The movement mechanisms 4A and 4C differ from those of the above-mentioned first embodiment in that they are attached without being vertically inverted although they are parallel to each other. Likewise, the driving unit DU22 includes movement mechanisms 41B and 41D, and the movement mechanisms 41B and 41D are attached without being vertically inverted although they are parallel to each other.

In this example, the width of the device can be decreased more in a direction (the axial direction of a converter 42) perpendicular to the optical-axis direction.

Note that the present invention should be interpreted from only items described in the scope of claims, and all changes and modifications included in the concept of the present invention are possible in addition to the described items even in the above-described embodiments. That is, all items in the above-described embodiments are not intended to limit the present invention, and these items and all components not directly related to the present invention can freely be changed in accordance with the purpose and object.

What is claimed is:

1. A light amount adjustment device comprising:
   a light path forming member including an aperture for forming a light path;
   a plurality of light amount adjustment members configured to adjust an amount of light passing through said aperture;
   a plurality of movement units configured to linearly advance and retract said light amount adjustment members with respect to said aperture in an advance/retraction direction; and
   a plurality of guide members configured to guide movement of said light amount adjustment members,
   wherein each movement unit is arranged on one side of a corresponding light amount adjustment member when viewed from the advance/retraction direction, and
   wherein each guide member is arranged on another side of corresponding light amount adjustment member when viewed from the advance/retraction direction.

2. The light amount adjustment device according to claim 1, wherein each movement unit includes a converter configured to convert a motor output into a linear motion and linearly move said light amount adjustment member.

3. The light amount adjustment device according to claim 1, further comprising a plurality of driving units,
   wherein each driving unit comprises:
   (a) at least two movement units of the plurality of movement units; and
   (b) a common support member configured to support said at least two movement units.

4. The light amount adjustment device according to claim 3, wherein said plurality of driving units include at least a pair of driving units opposing each other with said aperture being sandwiched therebetween.

5. The light amount adjustment device according to claim 1, further comprising a plurality of driving units opposing each other with said light amount adjustment members being sandwiched between them,
   wherein each driving unit comprises:
   (a) at least one movement unit of the plurality of movement units; and
   (b) a support member configured to support said at least one movement unit,
   wherein said movement unit includes a converter configured to convert a motor output into a linear motion and linearly move corresponding light amount adjustment member, and
   wherein one converter is opposed to another converter such that at least portions thereof overlap each other between said plurality of driving units.

6. The light amount adjustment device according to claim 1, wherein said plurality of movement units are arranged such that at least portions of adjacent movement units overlap each other in an optical-axis direction.

7. The light amount adjustment device according to claim 1, wherein each of said plurality of movement units linearly advances and retracts one light amount adjustment member with respect to said aperture.

8. The light amount adjustment device according to claim 1, wherein a plurality of said light amount adjustment members are arrayed along an optical-axis direction.

9. The light amount adjustment device according to claim 1, wherein said light path forming member forms a retraction space for said light amount adjustment member to retract outside said aperture.

10. The light amount adjustment device according to claim 1, wherein each of said plurality of movement units linearly advances and retracts at least one light amount adjustment member with respect to said aperture.

11. The light amount adjustment device according to claim 1, wherein said plurality of light amount adjustment members have different transmittances, and have equal reflected light colors.

12. An optical device comprising a light amount adjustment device according to claim 1.

13. A light amount adjustment device comprising:
    a light path forming member including an aperture for forming a light path;
    a plurality of light amount adjustment units configured to adjust an amount of light passing through said aperture; and
    a plurality of movement units for linearly advancing and retracting said light amount adjustment units with respect to said aperture,
    wherein at least portions of said plurality of movement units are arranged to overlap each other in an optical-axis direction,
    wherein motors of said plurality of movement units oppose each other in a moving direction of said light amount adjustment units,
    wherein each light amount adjustment unit includes an engaging portion which engages with a corresponding movement unit, and
    wherein said engaging portion is moved between said motors opposing each other.

14. An optical device comprising a light amount adjustment device according to claim 13.

15. The light amount adjustment device comprising:
    a light path forming member including an aperture for forming a light path;
    a first unit; and
    a second unit,
    wherein each of said first unit and the second unit includes:
    (a) a light amount adjustment member configured to adjust an amount of light passing through said aperture:
    (b) a holding member configured to hold said light amount adjustment member;
    (c) a movement unit configured to be engaged with said holding member and to linearly advance and retract said light amount adjustment member with respect to said aperture through said holding member in an advance/retraction direction;
    (d) a first guide member configured to be engaged with said holding member and to guide movement of said light amount adjustment member through said holding member; and
    (e) a second guide member configured to be engaged with said holding member and to guide movement of said light amount adjustment member through said holding member,
    wherein said movement unit and said second guide member are arranged on one side of a corresponding light amount adjustment member when viewed from the advance/retraction direction, wherein said first guide member is arranged on another side of a corresponding light amount adjustment member when viewed from the advance/retraction direction, and wherein said first guide member of said second unit is arranged between said second guide member of said first unit and said movement unit of said first unit when viewed from a direction orthogonal to both the advance/retraction direction and an optical-axis direction.

* * * * *